United States Patent
Muldoon et al.

(10) Patent No.: US 11,255,263 B2
(45) Date of Patent: Feb. 22, 2022

(54) MULTI CORE GEARED GAS TURBINE ENGINE

(71) Applicant: United Technologies Corporation, Farmington, CT (US)

(72) Inventors: Marc J. Muldoon, Marlborough, CT (US); Joseph B. Staubach, Colchester, CT (US); Jesse M. Chandler, South Windsor, CT (US); Neil Terwilliger, Meriden, CT (US); Gabriel L. Suciu, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 34 days.

(21) Appl. No.: 16/733,504

(22) Filed: Jan. 3, 2020

(65) Prior Publication Data

US 2021/0207530 A1    Jul. 8, 2021

(51) Int. Cl.
*F02C 7/36* (2006.01)
*F02C 6/20* (2006.01)

(52) U.S. Cl.
CPC . *F02C 6/20* (2013.01); *F02C 7/36* (2013.01)

(58) Field of Classification Search
CPC .............. F02C 7/36; F02C 3/107; F02K 3/12
See application file for complete search history.

(56) References Cited

U.S. PATENT DOCUMENTS

| | | |
|---|---|---|
| 2,601,194 A | 6/1952 | Whittle |
| 2,838,913 A | 6/1958 | Peterson et al. |
| 5,239,830 A * | 8/1993 | Banthin ............ F01D 13/003 60/39.15 |
| 6,868,664 B2 | 3/2005 | Albero et al. |
| 8,726,633 B2 | 5/2014 | Roberge |
| 2009/0056309 A1 * | 3/2009 | Roberge ............... F02K 3/06 60/263 |
| 2013/0001948 A1 * | 1/2013 | Lim ..................... F02C 7/08 290/52 |
| 2013/0219905 A1 | 8/2013 | Marconi et al. |
| 2015/0247456 A1 * | 9/2015 | Suciu .................. F02C 6/02 60/791 |
| 2015/0260127 A1 | 9/2015 | Wennerstrom |
| 2018/0327109 A1 * | 11/2018 | Coat ................... F02K 3/06 |
| 2019/0368370 A1 | 12/2019 | Chandler |

OTHER PUBLICATIONS

European Search Report for European Application No. 21150077.2 dated May 31, 2021.

* cited by examiner

*Primary Examiner* — Gerald L Sung
(74) *Attorney, Agent, or Firm* — Carlson, Gaskey & Olds, P.C.

(57) ABSTRACT

An aircraft propulsion system includes a fan section that includes a fan shaft that is rotatable about a fan axis. The fan shaft includes a fan gear. The aircraft propulsion system also includes a boost turbine engine that includes a first output shaft that includes a first gear that is coupled to the fan gear. The boost turbine engine has a first maximum power capacity. The aircraft propulsion system further includes a cruise gas turbine engine that includes a second output shaft that includes a second gear that is coupled to the fan gear. The cruise turbine engine has a second maximum power capacity that is less than the first maximum power capacity of the boost turbine engine. The fan section produces a thrust that corresponds to power input through the fan gear from the boost turbine engine and the cruise turbine engine.

7 Claims, 5 Drawing Sheets

MULTI CORE GEARED GAS TURBINE ENGINE

BACKGROUND

A gas turbine engine utilizes a high-speed exhaust gas flow expanded through a turbine section to drive a compressor and fan section. The fan section generates a propulsive flow that produces thrust. The gas turbine engine is designed and built to provide sufficient thrust at a sea level takeoff condition at extreme temperature and load conditions. The thrust requirements at sea level takeoff conditions result in an engine that may not be as efficient at cruise conditions. The design balance between an engine that can provide desired fuel efficiencies at cruise while also meeting durability and maximum thrust requirements results in compromises in overall engine efficiency.

Turbine engine manufacturers continue to seek further improvements to engine performance including improvements to thermal, transfer and propulsive efficiencies.

SUMMARY

In a featured embodiment, an aircraft propulsion system includes a fan section that includes a fan shaft that is rotatable about a fan axis. The fan shaft includes a fan gear. The aircraft propulsion system also includes a boost turbine engine that includes a first output shaft that includes a first gear that is coupled to the fan gear. The boost turbine engine has a first maximum power capacity. The aircraft propulsion system further includes a cruise gas turbine engine that includes a second output shaft that includes a second gear that is coupled to the fan gear. The cruise turbine engine has a second maximum power capacity that is less than the first maximum power capacity of the boost turbine engine. The fan section produces a thrust that corresponds to power input through the fan gear from the boost turbine engine and the cruise turbine engine.

In another embodiment according to the previous embodiment, the aircraft propulsion system further includes a clutch that is operable to decouple the first output shaft from the first gear.

In another embodiment according to any of the previous embodiments, a gear ratio between the first gear and the fan gear is different than a gear ratio between the second gear and the fan gear.

In another embodiment according to any of the previous embodiments, a longitudinal axis of the boost turbine engine is offset from the fan axis.

In another embodiment according to any of the previous embodiments, the aircraft propulsion system further includes a first inlet duct that communicates air from the fan section to the boost turbine engine and a second inlet duct that communicates airflow from the fan section to the cruise gas turbine engine separate from the first inlet duct.

In another embodiment according to any of the previous embodiments, each of the boost turbine engine and the cruise gas turbine engine are supported aft of the fan section.

In another embodiment according to any of the previous embodiments, the first maximum power provides at least 55% of the power to generate a maximum thrust. The maximum thrust includes a thrust generated from a sum of the first maximum power and the second maximum power.

In another embodiment according to any of the previous embodiments, the boost turbine engine is a two spool turbine engine and the cruise turbine engine is two spool turbine engine.

In another embodiment according to any of the previous embodiments, the boost turbine engine is a single spool engine and the cruise turbine engine is two spool turbine engine.

In another embodiment according to any of the previous embodiments, the aircraft propulsion system further includes a controller that is adapted to control an operation of the boost turbine engine and an operation cruise turbine engine. The controller includes instructions to cause both the boost turbine engine and the cruise turbine engine to operate during a sea level takeoff condition and to shut down the boost turbine engine after takeoff.

In another embodiment according to any of the previous embodiments, the controller includes instructions to cause the cruise engine to operate during an aircraft ground operation before takeoff.

In another featured embodiment, a method of operating an aircraft propulsion system includes coupling a first gear driven by a boost turbine engine to a fan gear of a fan section, coupling a second gear driven by a cruise turbine engine to the fan gear of the fan section, and generating thrust at the fan section with power produced by at least one of the boost turbine engine and the cruise turbine engine. A maximum power of the boost turbine engine is different than a maximum power of the cruise turbine engine.

In another embodiment according to the previous embodiment, the method further includes controlling power input into the fan section from the boost turbine engine and the cruise turbine engine with a controller. The controller commands operation of both the boost turbine engine and the cruise turbine engine to generate takeoff thrust.

In another embodiment according to any of the previous embodiments, the method further includes shutting off the boost turbine engine and powering the fan section with the cruise turbine engine during aircraft cruise conditions.

In another embodiment according to any of the previous embodiments, the method further includes adjusting relative power between the boost turbine engine and the cruise turbine engine to power the fan during aircraft climb conditions.

In another embodiment according to any of the previous embodiments, the method further includes starting the boost turbine engine prior to landing.

In another embodiment according to any of the previous embodiments, the method further includes powering the fan section with only the cruise turbine engine during aircraft taxi operations.

In another embodiment according to any of the previous embodiments, the method further includes decoupling the boost turbine engine from the fan section during aircraft cruise conditions using a clutch.

In another embodiment according to any of the previous embodiments, at least one duct is in communication between the fan section and each of the boost turbine engine and the cruise turbine engine. The method further includes routing air from the fan section around the first gear, the second gear and the fan gear to each of the boost turbine engine and the cruise turbine engine through the at least one duct.

In another embodiment according to any of the previous embodiments, the method includes closing off airflow to the boost engine in response to shutting off the boost turbine engine.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
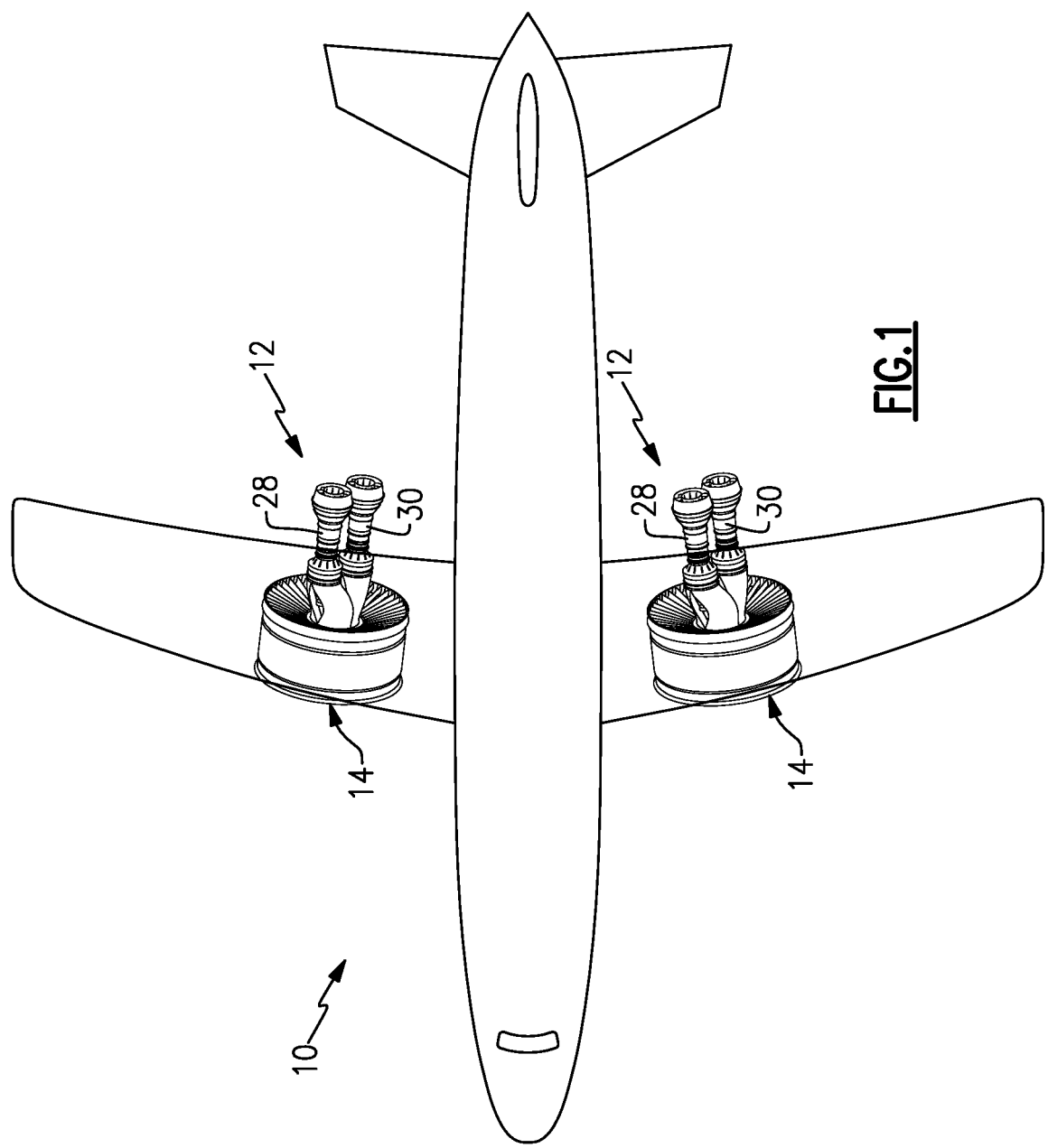
FIG. 1 is a schematic view of an aircraft with an example propulsion system.

FIG. 1 schematically illustrates an aircraft 10 with propulsion systems 12 that provide increased operational efficiencies at each stage of a flight profile. The example propulsion system 12 includes a fan section 14 that is powered by at least two turbine engines. The two turbine engines include a boost turbine engine 28 and a cruise turbine engine 30. The turbine engines 28, 30 are selectively operated to tailor input power for the fan section 14 to produce the required thrust at each stage of a flight profile.

Figure 2:
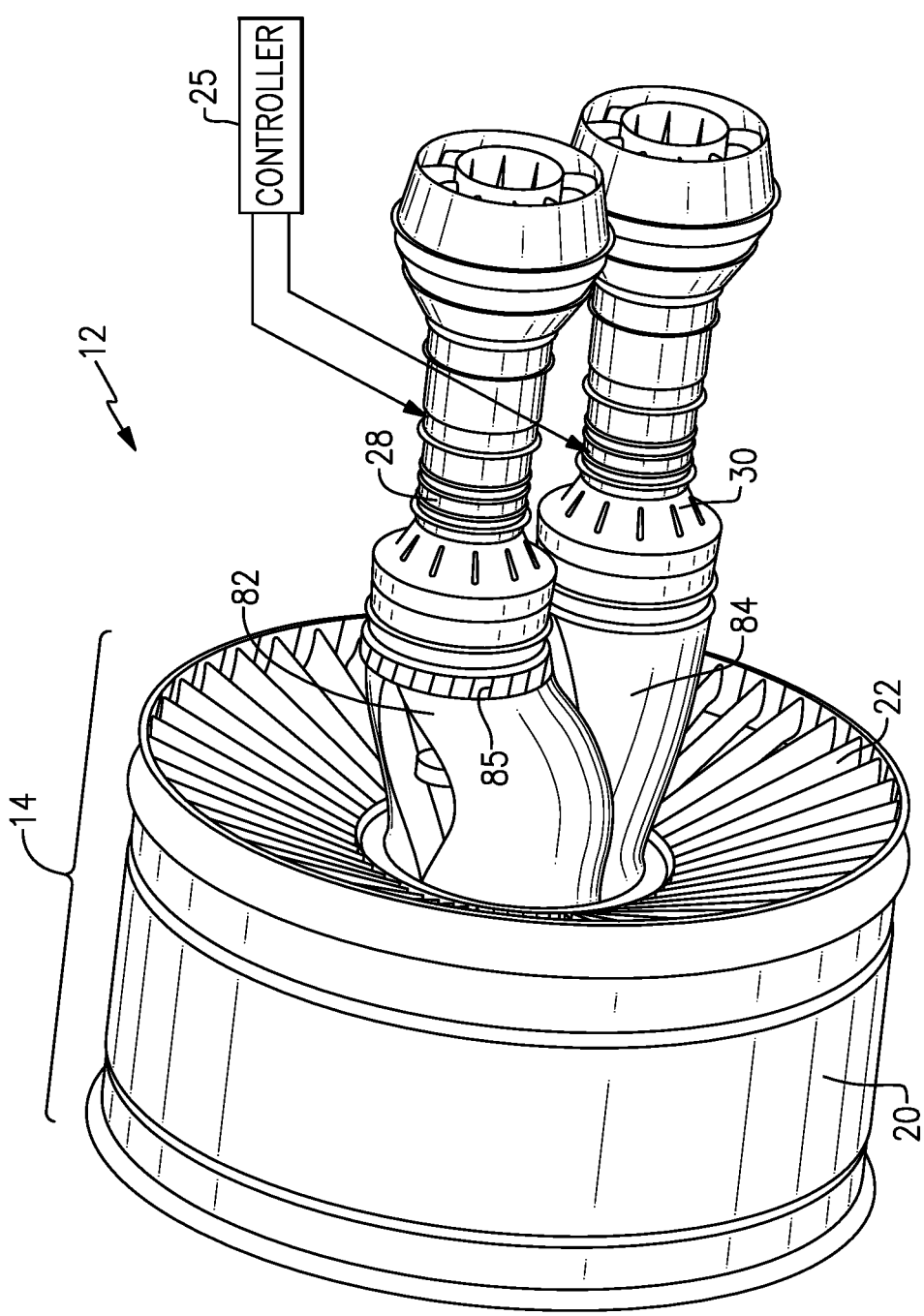
FIG. 2 is a perspective view of an example propulsion system embodiment.

Referring to FIG. 2 with continued reference to FIG. 1, the boost turbine engine 28 is configured to operate at peak efficiency at sea level takeoff conditions with relative high ambient temperatures. The cruise turbine engine 30 is configured to operate at peak efficiency at lower temperatures and lower thrust requirements such as are encountered during a cruise stage of a flight profile. One example cruise condition includes a flight speed of about 0.8 Mach and about 35,000 feet (10,668 meters). The flight condition of 0.8 Mach and 35,000 ft (10,668 meters) may be referred to as bucket cruise Thrust Specific Fuel Consumption ('TSFC'). The TSFC is a parameter of lbm of fuel being burned divided by lbf of thrust the engine produces at the cruise condition.

A controller 25 commands operation of each of the engines 28, 30 to provide power input to the fan section 14 based on thrust demands. The example controller 25 relates to a device and system for performing necessary computing or calculation operations. This system may be specially constructed for this purpose, or it may comprise at least a general-purpose computer selectively activated or reconfigured by a computer program stored in the computer. The computing system can also consist of a network of (different) processors. A computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus.

Furthermore, the computer referred to may include a single processor or may be architectures employing multiple processor designs for increased computing capability.

The engines 28, 30 are fed air from the fan section 14 through ducts 82, 84. The ducts 82, 84 direct flow around a mechanical driving connection between the engines 28, 30 and the fan section 14. The duct 82 may include a variable ducting 85 that may be used to reduce or eliminate airflow through the boost engine to reduce drag and improve performance.

Figure 3:
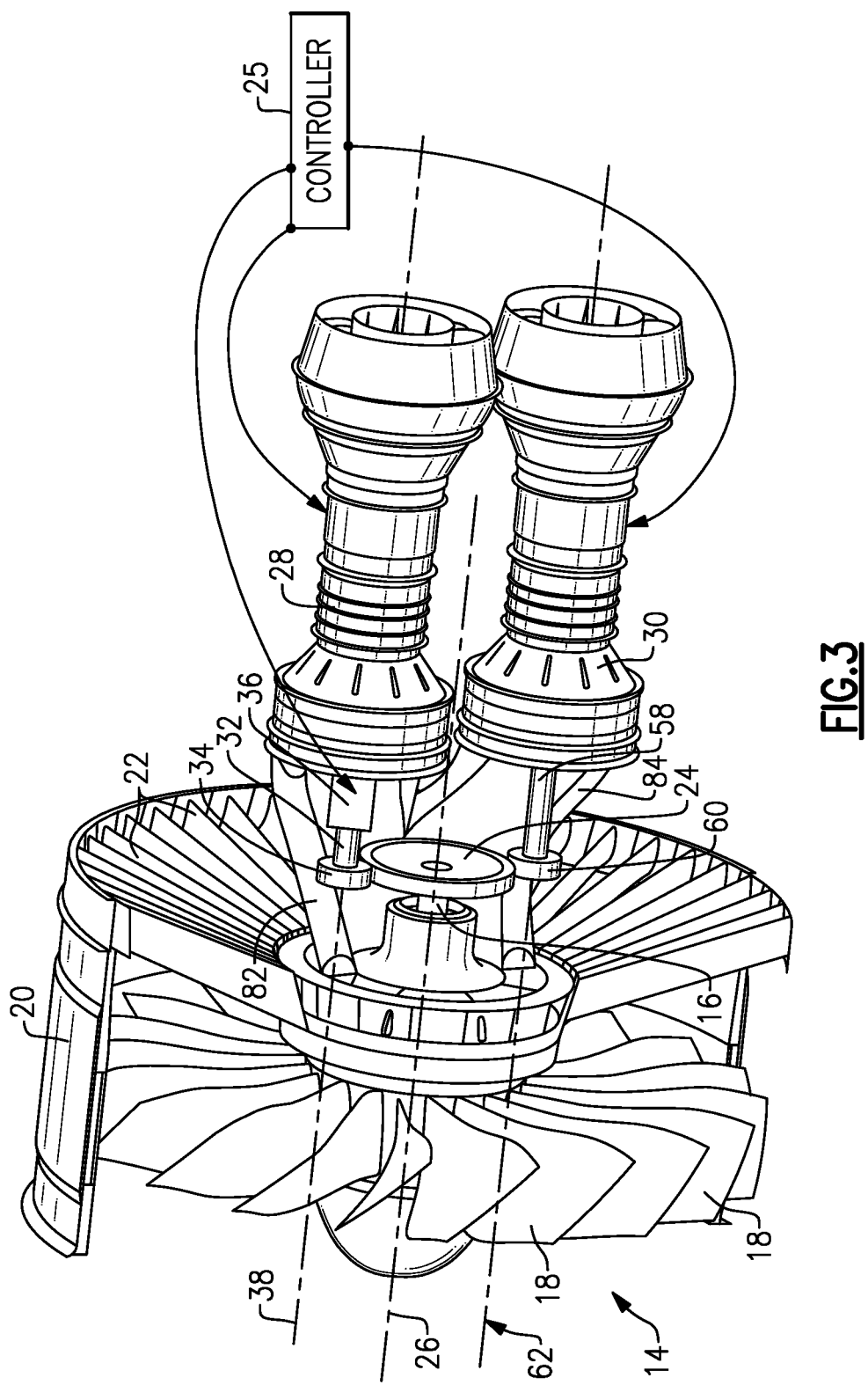
FIG. 3 is a partial cutaway perspective view of the example propulsion system embodiment.

Referring to FIG. 3 with continued reference to FIG. 2, the fan section 14 includes a plurality of fan blades 18 that are rotatable about a fan axis 26. The fan blades 18 rotate within a fan case 20 that includes exit guide vanes 22. A fan shaft 16 includes a fan bull gear 24 that is coupled to a first pinion gear 34 and a second pinion gear 60. The engines 28, 30 are disposed about corresponding first and second engine axes 38, 62 that are offset and spaced apart from the fan axis 26.

The boost turbine engine 28 drives a first shaft 32 that includes the first pinion gear 34. The cruise turbine engine 30 drives a second shaft 58 that includes the second pinion gear 60. The size of the first pinion gear 34 is arranged to provide a desired gear ratio with the fan bull gear 24. Similarly, the size of the second pinion gear 60 is also sized to provide a desired gear ratio with the fan bull gear 24.

In one disclosed example embodiment, the sizes of the first pinion gear 34 and the second pinion gear 60 may be the same to provide the same gear ratio. In another disclosed example embodiment, the sizes of the first pinion gear 34 and the second pinion gear 60 are different. In either example configuration, the fan bull gear 24 is coupled to both the first pinion gear 34 and the second pinion gear 60 and is the driving connection between the engines 28, 30 and the fan shaft 16.

In this example embodiment, the ducts 82, 84 receive air that has been accelerated through the fan blades 18 and is supercharged. Accordingly, the engines 28, 30 are aft of the fan section 14 and receive supercharged air that is exiting the fan blades 18. In this example, the fan ducts 82, 84 are arranged to direct air flow around the interface between the bull gear 24, the pinion gears 34, 60 and the shafts 16, 36 and 58. The origins of each duct is substantially closer to the inner diameter of the fan section 14 to provide a high bypass flow that produces a majority of thrust produced by the propulsion system 12.

A clutch 36 is provided on the first shaft 32 to permit the boost turbine engine 28 to be decoupled and not back driven when turned off. The clutch 36 may be passive or actively controlled. An actively controlled clutch 36 is commanded by the controller 25 to selectively decouple during specific stages of the flight profile.

The boost turbine engine 28 and the cruise turbine engine 30 combine to provide power to the fan section 14 and produce thrust. The maximum power produced by each of the boost turbine engine 28 and the cruise turbine engine 30 are different to accommodate the different thrust requirements encountered during flight operations. In one disclosed example, the boost turbine engine 28 includes a maximum power capacity at sea level operating conditions that is greater than a maximum power capacity of the cruise turbine engine 30. In one disclosed example embodiment, the boost turbine engine 28 provides at least 55% of the power required to produce a maximum thrust. The cruise turbine engine 30 provides the remaining power needed to produce the maximum thrust from the propulsion system 12.

The boost engine 28 and the cruise engine 30 are configured differently to provide efficient operation and different operating conditions. As appreciated, typical engine configurations provide all the power required at each stage of a flight. As the power needs and environment differ drastically at the different flight stages, typical engines are designed to provide for maximum thrust conditions at a sea level takeoff condition. The resulting engine is therefore not as efficient as possible at other operating conditions. The disclosed propulsion system 12 provides the boost engine 28 that is configured to produce power and operate the sea level takeoff condition with hot ambient conditions and maximum thrust requirements. The cruise engine 28 is configured for operation at lower ambient temperatures as are experienced during cruise conditions with lower thrust requirements. The engines 28, 30 are therefore adapted for operation at specific operating conditions to improve overall propulsion system efficiency.

Figure 4:
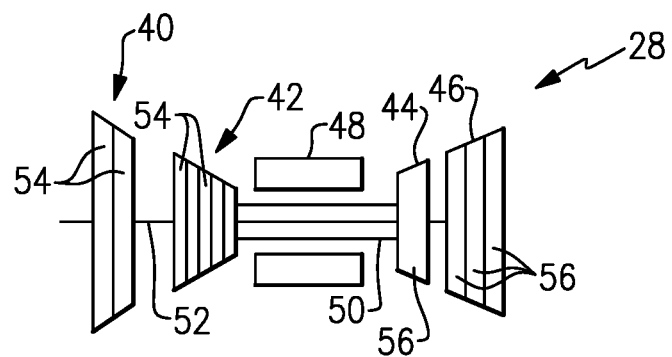
FIG. 4 is a schematic view of an example boost turbine engine embodiment.
Figure 5:
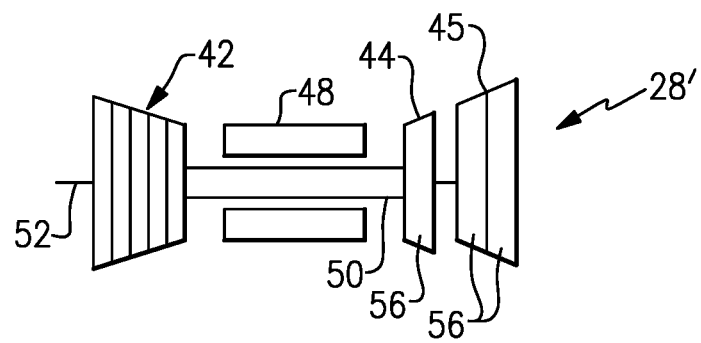
FIG. 5 is a schematic view of another example boost turbine engine embodiment.
Figure 6:
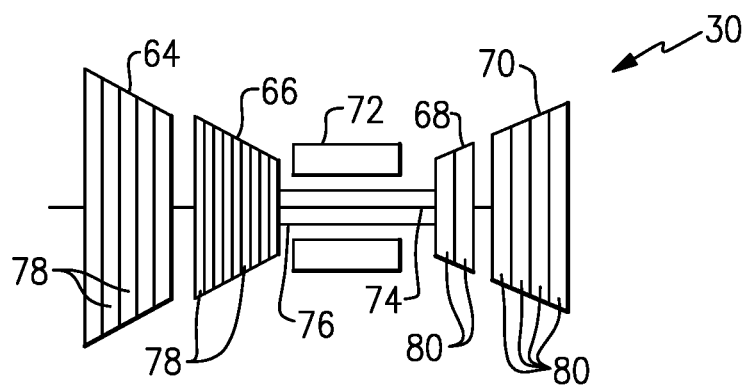
FIG. 6 is a schematic view of an example cruise turbine engine embodiment.

Referring to FIGS. 4, 5 and 6, the engines 28, 28' and 30 are each shown schematically to illustrate one example of disclosed differences in engine configurations. The boost engine may be a two spool engine 28 (FIG. 4) or a single spool engine 28' (FIG. 5). The boost engines 28, 28' are configured with a bias toward power density rather than efficiency.

The example two spool boost engine 28 includes a low spool with a low pressure compressor 40 that is coupled to a low pressure turbine 46 through an inner shaft 52. A high spool includes a high pressure compressor 42 that is coupled to a high pressure turbine 44 through an outer shaft 50. A combustor 48 mixes compressed air from the compressors 40, 42, with fuel ignites the mixture to produce a high energy gas flow that expands through the turbines 44, 46. In this example, embodiment, the compressors 40, 42 and the turbines 44, 46 includes a number of stages 54 and 56 respectively.

The example single spool configuration 28' includes a high pressure compressor 42, a high pressure turbine 44 and a free turbine 45 connected to a drive shaft 52.

Referring to FIG. 6, the cruise turbine engine 30 is a two spool engine with a low and high spool. The low spool includes a low pressure compressor 64 that is coupled to a low pressure turbine 70 through an inner shaft 74. The high spool includes a high pressure compressor 66 that is coupled to a high pressure turbine 68 through an outer shaft 76. A combustor 72 is disposed axially between the compressors 64, 66 and the turbines 68, 70. In this example the compressors 64, 66 and the turbines 68, 70 include stages 78 and 80 respectively.

In one disclosed embodiment, the number of stages 78, 80 in the cruise engine 30 is more than the number of stages 54, 56 in either of the boost engines 28, 28' and are arranged to provide the different levels of power output at different operating conditions. In another disclosed embodiment, the engine 28 includes a two-stage low pressure compressor 40, a five-stage high pressure compressor 42, a single stage high pressure turbine 44 and a three-stage low pressure turbine 46. In another disclosed embodiment, the engine 28' includes a five-stage high pressure compressor 42, a single stage high pressure turbine 44 and a two-stage free turbine 45. In another disclosed embodiment, the engine 30 includes a five-stage low pressure compressor 64, a nine-stage high pressure compressor 66, a two-stage high pressure turbine 68 and a four-stage low pressure turbine 70.

It should be appreciated that different numbers of stages are only one example for configuring the engines 28, 28' and 30 to operate efficiently at different operating conditions. Moreover, although specific numbers of stages are shown by way of example for each of the engines 28, 28' and 30, other numbers and combinations of stage counts could be utilized within the scope and contemplation of this disclosure.

Figure 7:
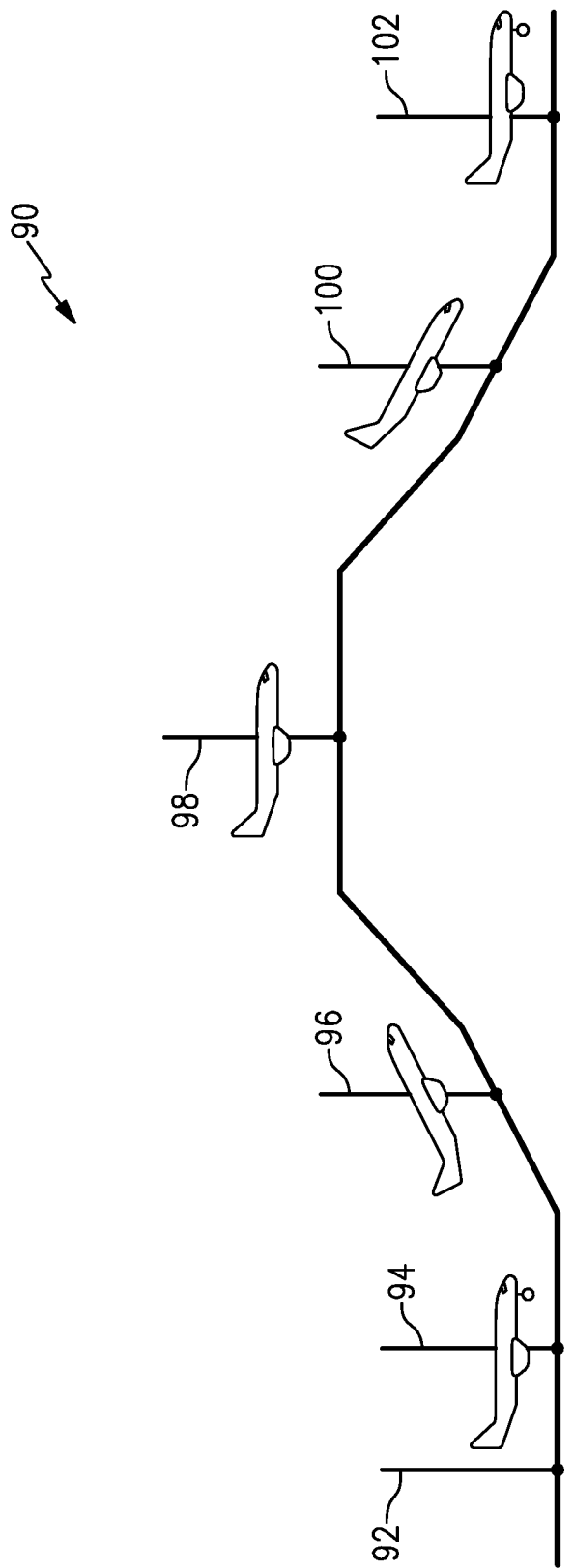
FIG. 7 is a schematic view of operation of an example aircraft propulsion system at different stages of a flight profile.

Referring to FIG. 7 with continued reference to FIG. 3, an example flight profile 90 is schematically shown. The disclosed propulsion system 12 provides an efficient operation at each stage of the flight profile 90 by selectively engaging and disengaging the boost turbine engine 28 and the cruise turbine engine 30. At a beginning stage of the flight profile indicated at 92, the propulsion system 12 operates less than all of the turbine engines, for example only the cruise turbine engine 30, while the boost turbine engine 30 is not yet started and/or decoupled by way of the clutch 36. The cruise turbine engine 30 is operated at a higher percentage of its own maximum power than a conventional single core engine at the idle/taxi stage because the cruise engine provides efficient cruise thrust. The cruise turbine engine may be a relative high overall pressure ratio engine that is adapted for low fuel consumption at cruise conditions.

Because the cruise turbine engine 30 is used for idling and ground taxi at a higher percentage of its maximum power, it will operate at closer to optimal design conditions and that improves idle fuel burn and stability while at the same time not creating excessive idle thrust.

Once the aircraft 10 is ready for takeoff, indicated at 94, the boost turbine engine 28 is started and the clutch 36 engaged to provide additional power input to the fan section 14. The boost turbine engine 28 preferably is turned on prior to takeoff with sufficient time to warm-up and is operated continuously through a climb stage 96. During the takeoff stage 94 and the climb stage 96, the cruise turbine engine 30 is operated at less than its maximum power in order to limit flow path temperatures for improved durability and life of the engine. Accordingly, at the take off stage 94 and the climb stage 96, both the boost engine 28 and the cruise engine 30 input power to the fan section 14 through the bull gear 24. During these stages 94, 96, the boost turbine engine 28 provides the majority of power to the fan section 14. The cruise turbine engine 30 is operating at a speed less than its maximum to limit wear and temperatures because the cruise turbine engine 30 is adapted for operation at the lower temperatures encountered during a cruise flight stage indicated at 98.

Once the aircraft 10 reaches a cruise altitude (or at a point after takeoff and before reaching a cruise altitude) and enters the cruise stage 98 of the flight profile, the boost turbine engine 28 is turned off. Turning off the boost turbine engine 28 may include complete shut down or idling at a very low fuel consumption condition. In either case, the clutch 36 may be actuated to decouple the boost turbine engine 28 from the fan section 14. Power to the fan section is provided by the cruise turbine engine 30 during cruise conditions. The cruise turbine engine 30 is adapted to operate at a fuel efficient point at cruise altitude conditions such as TSFC conditions. During cruise conditions, variable ducting as schematically indicated at 85 in FIG. 2, may be used to reduce or eliminate airflow through the boost engine to reduce drag and improve performance. In one disclosed embodiment, airflow to the boost turbine engine is closed off in response to shutting of the boost turbine engine.

Once the aircraft 10 begins its decent as shown at 100, the boost turbine engine 28 is restarted and/or reengaged. The boost turbine engine 28 is reengaged during descent to provide warm up time. The boost turbine engine 28 may be started utilizing air ducted from the operating cruise turbine engine 30. The boost turbine engine 28 may also be started utilizing an electric motor powered by energy produced by the operating cruise turbine engine 30. The boost turbine engine 28 is reengaged to provide sufficient power to create thrust should the aircraft need to perform a go around operation and also to provide thrust reverser power to slow and stop the aircraft upon landing.

Once the aircraft 10 has landed as shown at 102, the boost turbine engine 28 is turned off and/or disengages and the cruise turbine engine 30 operated to power ground movement of the aircraft 10. While the boost turbine engine 28 is shut down, the clutch 36 may be disengaged to prevent back driving of the engine.

Accordingly, the example propulsion system 12 includes at least two different engines that are adapted for operation at different stages of flight profile to increase operating efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of operating an aircraft propulsion system, comprising:
    coupling a first gear driven by a boost turbine engine to a fan gear of a fan section;
    coupling a second gear driven by a cruise turbine engine to the fan gear of the fan section;
    generating thrust at the fan section with power produced by at least one of the boost turbine engine and the cruise turbine engine, wherein
    a maximum power of the boost turbine engine is different than a maximum power of the cruise turbine engine; and
    controlling power input into the fan section from the boost turbine engine and the cruise turbine engine with a controller, wherein the controller commands operation of both the boost turbine engine and the cruise turbine engine to generate takeoff thrust and to start the boost turbine engine prior to landing.

2. The method as recited in claim 1, further comprising shutting off the boost turbine engine and powering the fan section with the cruise turbine engine during aircraft cruise conditions.

3. The method as recited in claim 1, further comprising adjusting relative power between the boost turbine engine and the cruise turbine engine to power the fan during aircraft climb conditions.

4. The method as recited in claim 1, further comprising powering the fan section with only the cruise turbine engine during aircraft taxi operations.

5. The method as recited in claim 1, further comprising decoupling the boost turbine engine from the fan section during aircraft cruise conditions using a clutch.

6. The method as recited in claim 1, wherein at least one duct is in communication between the fan section and each of the boost turbine engine and the cruise turbine engine, wherein the method further comprises routing air from the fan section around the first gear, the second gear and the fan gear to each of the boost turbine engine and the cruise turbine engine through the at least one duct.

7. A method of operating an aircraft propulsion system, comprising:
    coupling a first gear driven by a boost turbine engine to a fan gear of a fan section;
    coupling a second gear driven by a cruise turbine engine to the fan gear of the fan section;
    generating thrust at the fan section with power produced by at least one of the boost turbine engine and the cruise turbine engine, wherein a maximum power of the boost turbine engine is different than a maximum power of the cruise turbine engine;
    routing air from the fan section around the first gear, the second gear and the fan gear to each of the boost turbine engine and the cruise turbine engine through at least one duct, wherein the at least one duct is in communication between the fan section and at least one of the boost turbine engine and the cruise turbine engine; and
    closing off airflow to the boost turbine engine in response to shutting off the boost turbine engine.

* * * * *